United States Patent [19]

Krüger

[11] 4,152,638

[45] May 1, 1979

[54] APPARATUS FOR THE PRODUCTION OF MAGNETIC FIELDS FOR POLARIZING AND INDUCING RESONANCE IN A FLOWING MEDIUM

[75] Inventor: Gottfried J. Krüger, Reno di Leggiuno, Italy

[73] Assignee: European Atomic Energy Community, Luxembourg

[21] Appl. No.: 846,184

[22] Filed: Oct. 27, 1977

[30] Foreign Application Priority Data

Oct. 26, 1976 [DE] Fed. Rep. of Germany ....... 2648502

[51] Int. Cl.² .......................................... G01R 33/08
[52] U.S. Cl. ............................ 324/0.5 MA; 324/0.5 B
[58] Field of Search ........... 324/0.5 R, 0.5 B, 0.5 MA

[56] References Cited

U.S. PATENT DOCUMENTS

| | | | |
|---|---|---|---|
| 3,419,793 | 12/1968 | Genthe et al. | 324/0.5 B |
| 3,473,108 | 10/1969 | McCormick | 324/0.5 B |

Primary Examiner—M. Tokar
Attorney, Agent, or Firm—Stevens, Davis, Miller & Mosher

[57] ABSTRACT

Apparatus for the measurement of mass throughput in a flowing medium comprises a conduit between the pole pieces of an electromagnet which produces polarizing and resonating fields. The pole pieces are shaped to provide a first section in which the separation of the pieces is relatively small and a second, shorter section in which the separation is greater. The single magnet thereby produces different flux densities for polarizing and inducing nuclear resonance respectively and an improved signal-to-noise ratio by the application of a polarizing field which is more intense than the resonating field.

6 Claims, 3 Drawing Figures

U.S. Patent     May 1, 1979     4,152,638
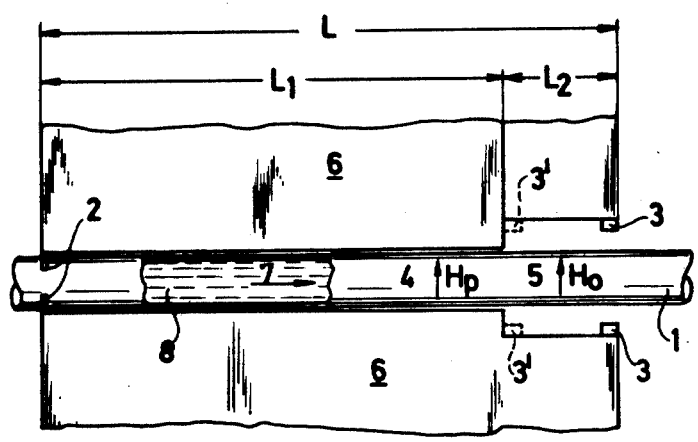
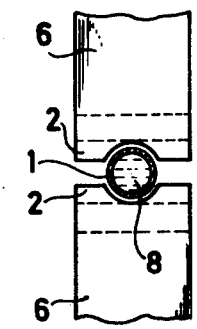
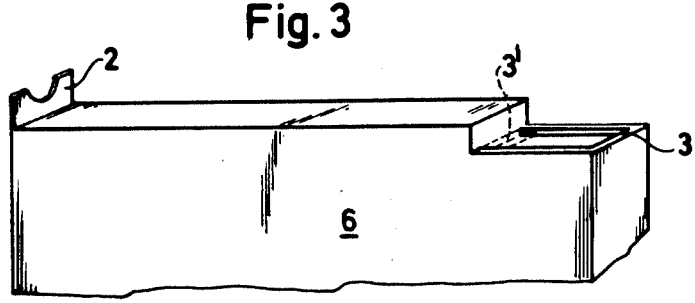

APPARATUS FOR THE PRODUCTION OF MAGNETIC FIELDS FOR POLARIZING AND INDUCING RESONANCE IN A FLOWING MEDIUM

BACKGROUND OF THE INVENTION

This invention relates to apparatus for the production of magnetic fields for polarizing, and inducing nuclear resonance in, a flowing medium.

Various methods for the measurement of the throughput of mass in a flowing medium have been proposed and it is known that there is a relationship between the nuclear magnetization and the flow velocity of a flowing medium. The use of separate magnets for the production of respective fields for polarizing and inducing resonance in the flowing medium has been proposed, but is not entirely satisfactory.

SUMMARY OF THE INVENTION

According to the present invention, a single magnet is used for the production of a polarizing field and a different, resonating field.

In a particularly suitable embodiment according to the invention, apparatus for the production of magnetic fields for polarizing and inducing nuclear resonance in a flowing medium comprises a conduit, through which the medium flows, and a magnet which has a pair of opposed pole pieces extending along the length of the conduit, a first section of the pole pieces being disposed to produce a relatively greater magnetic flux density across the conduit for a relatively greater part of the said length and a second section of the pole pieces being disposed to produce a relatively lesser magnetic flux density across the conduit for a relatively lesser part of the said length.

The said greater proportion may be approximately 80% of the total length of the magnet. The magnetic flux density of the field along this part of the said length may be approximately 1 Tesla and ought generally to be as great as possible in order to increase the signal-to-noise ratio, whereas the magnetic flux density of the field across the conduit for the relatively lesser part of the length may be approximately 0.5 Tesla.

A preferred embodiment of the invention is particularly suitable for use in reactors, because it may be accommodated in a confined space. Moreover, the use of a polarizing field of relatively greater flux density than that of the resonating field improves the signal-to-noise ratio in corresponding proportion. Accordingly, the preferred embodiment is suitable for, though not necessarily limited to, the measurement of mass throughput in wide tubes that carry a high rate of flow, for which the signal-to-noise ratio is usually rather poor.

The medium is properly subjected to polarization before measurements of its resonance are made, and accordingly the relatively longer section of the pole pieces would be disposed upstream of the second, relatively shorter section. At the upstream end of the first section, the pole pieces may carry inward extensions which may terminate in parts which are inwardly concave. These terminations facilitate the production of a steep field gradient at the inlet.

DESCRIPTION OF THE ACCOMPANYING DRAWINGS

FIG. 1 is a schematic diagram of an apparatus according to the invention;

FIG. 2 illustrates a detail of an inlet part of the apparatus of FIG. 1; and

FIG. 3 is a perspective view of one pole piece in the apparatus shown in FIG. 1.

DESCRIPTION OF THE PREFERRED EMBODIMENT

The apparatus shown in the drawings is primarily, though not exclusively, intended for the measurement of mass throughput in a tube which constitutes part of a circulatory system of a nuclear reactor. The medium of which the mass throughput is to be measured flows in a tube 1 in the direction of an arrow 7. The flow through the tube 1 is commonly two phase and unsteady. The tube 1 is flanked by a pair of opposed pole pieces 6 of an electromagnet whose length L along the tube may be approximately 1 meter. The pole pieces have, along the length of the conduit constituted by the tube two sections, a leading section, of length $L_1$, in which the separation of the faces of the pole pieces is relatively small, and a second shorter section of length $L_2$, in which section the separation between the face of the pole pieces is somewhat greater. In the longer, leading section, the magnetic field 4 serves to polarize the medium whereas in the shorter, wider, section the magnetic field 5 serves to induce in the particles of the flowing medium nuclear magnetic resonance which can be measured by any suitable means, not shown. The magnetic fields have a principal direction transverse the conduit.

At the leading or inlet end of the magnet, the pole pieces carry narrow inward extensions 2 which more closely than the remainder of the pole pieces embrace the tube 1; the inner faces of the extensions 2 are preferably concave towards the tube 1. The polarizing field 4 in the longer section of the magnet is preferably substantially uniform, but the extensions increase the field gradient at the inlet end.

The maximum frequency of the measuring or resonating field 5 would normally be approximately 20MHz. The field strength $H_o$ of the resonating field is preferably, for inducing resonance in protons in water, sufficient to produce a magnetic flux density of approximately 0.5 Tesla. The magnetic field strength $H_p$ of the polarizing field 4 is preferably as great as possible. It is accordingly preferable to shape the pole pieces 6 so that the magnetic flux density of the polarizing field is approximately 1 Tesla throughout the first section.

The transition between the regions of the polarizing field and the resonating field is preferably such that the resonating field 5 is substantially uniform. The uniformity of the field 5 may be promoted by the insertion of iron shims 3,3' at the terminal parts of the shorter section of the magnet. At least the shim 3' may be omitted if desired. The shims 3, which each extend across the downstream end of the respective pole piece may extend longitudinally along the edges of the pole pieces on each side of the tube 1.

The signal to noise ratio is proportional to $H_p(H_o)^{\frac{1}{2}}$ and accordingly in the embodiment described the signal-to-noise power ratio may be improved by a factor of 2. Moreover, the spins of the hydrogen nuclei in the mass of flowing fluid 8 endure much longer in the polarizing field 4 than in the smaller leakage field in front of the magnet and the accuracy of measurement of nuclear magnetic resonance is improved accordingly.

I claim:

1. An apparatus for the production of separate magnetic fields for polarizing, and inducing nuclear resonance in, a flowing medium, comprising a conduit and a magnet which has a pair of opposed pole pieces extending along a length of the conduit, a first section of the pole pieces being disposed to produce relatively greater magnetic flux density across the conduit for a relatively greater proportion of the said length to produce said polarizing field and a second section of the pole pieces being disposed to produce a relatively lesser magnetic flux density across the conduit for a relatively lesser part of the said length to produce said resonating field.

2. An apparatus according to claim 1, wherein the separation between the pole pieces is less in the said first section than it is in the said second section.

3. An apparatus according to claim 2, wherein at one end of the said magnet, the pole pieces in the said first section have extensions which extend inwardly towards said conduit.

4. An apparatus according to claim 1, further comprising an iron shim on the face of each pole piece in said second section at the respective end of the magnet.

5. An apparatus according to claim 4, wherein said shims extend along the edges of the faces of the pole pieces.

6. An apparatus for producing separate magnetic fields for polarizing, and inducing nuclear resonance in, a flowing medium, comprising a single magnet having opposing pole pieces shaped to provide a first polarizing field of one flux density and a second resonating field of a different flux density and, means for passing said flowing medium between said opposing pole pieces such that said medium is first exposed to said polarizing field and then exposed to said resonating field.

* * * * *